United States Patent [19]

Naé et al.

[11] Patent Number: 5,336,647
[45] Date of Patent: Aug. 9, 1994

[54] ORGANOCLAY COMPOSITIONS PREPARED WITH A MIXTURE OF TWO ORGANIC CATIONS AND THEIR USE IN NON-AQUEOUS SYSTEMS

[75] Inventors: Hemi N. Naé, Princeton; William W. Reichert, Freehold; Alice C. Eng, Princeton Junction, all of N.J.

[73] Assignee: Rheox, Inc., Hightstown, N.J.

[21] Appl. No.: 791,318

[22] Filed: Nov. 14, 1991

[51] Int. Cl.$^5$ ............................................. C04B 33/02
[52] U.S. Cl. ................................. 501/146; 252/8.7; 252/8.8; 210/660; 210/723
[58] Field of Search .................. 252/8.7, 8.8; 210/660, 210/723; 501/141, 144, 145, 148, 146

[56] References Cited

U.S. PATENT DOCUMENTS

| | | | |
|---|---|---|---|
| 4,287,086 | 9/1981 | Finlayson et al. | 252/316 |
| 4,444,665 | 4/1984 | Hildebrandt | 210/660 |
| 4,569,923 | 2/1986 | Knudson, Jr. et al. | 501/448 |
| 4,623,398 | 11/1986 | Goodman et al. | 106/308 N |
| 4,631,091 | 12/1986 | Goodman et al. | 106/308 N |
| 4,676,915 | 6/1987 | Steltenkamp et al. | 252/8.8 |
| 4,844,821 | 7/1989 | Mermelstein et al. | 252/8.7 |
| 5,110,501 | 5/1992 | Knudson, Jr. et al. | 252/315.2 |

Primary Examiner—Mark L. Bell
Assistant Examiner—Alan Wright
Attorney, Agent, or Firm—Mason, Fenwick & Lawrence

[57] ABSTRACT

An organophilic clay comprising the reaction product of:
(a) a smectite-type clay;
(b) a first organic cation in an amount of from about 75% to about 150% of the cation exchange capacity of the smectite-type clay; and
(c) a second organic cation provided by a polyalkoxylated quaternary ammonium salt; wherein the second organic cation is present in an amount of from about 0.01% to about 20% by weight of the total organic cation content.

12 Claims, 2 Drawing Sheets

ORGANOCLAY COMPOSITIONS PREPARED WITH A MIXTURE OF TWO ORGANIC CATIONS AND THEIR USE IN NON-AQUEOUS SYSTEMS

BACKGROUND OF THE INVENTION

1. Field of the Invention

The present invention relates to organophilic clay complexes which are dispersible in non-aqueous fluids to form a gel therein. The invention also pertains to a process for preparing these novel organophilic clay gellants, and to non-aqueous fluid compositions including the same.

2. Description of the Prior Art

It is well known that organic compounds containing a cation will react with a clay under favorable conditions by ion exchange to form an organophilic clay. Furthermore, it is well known in the art that such organophilic clays can be used to thicken a variety of organic compositions. If the organic cation contains at least one alkyl group containing at least 10 carbon atoms, then such organoclays have the property of swelling in organic liquids. See for example, U.S. Pat. No. 2,966,506 and the book *Clay Mineralogy*, 2nd Ed., 1968, R. E. Grim (McGraw Hill Book Company).

It is also well known that such complexes may function to thicken polar or non-polar solvents, depending on the substituents on the organic salt. J. W. Jordan, in "Proceedings of the 10th National Conference on Clays and Clay Minerals" (1963), discusses a wide range of applications of organoclays from high polarity liquids to low polarity liquids.

The efficiency of organophilic clays in non-aqueous systems can be further improved by adding a low molecular weight polar organic material to the composition. Such polar organic materials have been called dispersants, dispersion aids, solvating agents, and the like. See for example U.S. Pat. Nos. 2,677,661; 2,704,276; 2,833,720; 2,879,229; and 3,294,683. The most efficient polar materials for use as such have been found to be low molecular weight alcohols and ketones, particularly methanol and acetone.

Furthermore, U.S. Pat. Nos. 3,977,894; 4,382,868; 4,464,274; and 4,664,820 describe the preparation of preactivated organophilic clay gellants that are used to thicken organic compositions wherein the activators are admixed with the organophilic clay.

More recently, organophilic clay gellants have been developed that are the reaction products of smectite-type clays having a cation exchange capacity with certain organic cations or combinations of organic cations and organic anions. These gellants have the advantage of being effectively dispersible in particular organic compositions without the need for a dispersion aid under normal shear conditions. Illustrative patents which describe such improved organophilic clay gellants are U.S. Pat. Nos. 4,105,578; 4,208,218; 4,287,086; 4,391,637, 4,410,364; 4,412,018; 4,434,075; 4,434,076; 4,450,095; and 4,517,112.

One way to enhance the gelling and dispersing efficiency of an organophilic clay is to replace some of the hydrophobic side groups attached to the organic cation with hydroxyalkyl groups. In these groups, the hydroxyl group is attached to any carbon atom on an aliphatic radical, except for the carbon atom adjacent to the positively charged atom, as disclosed in U.S. Pat. No. 4,434,076.

To further impart improved gelling properties, the groups attached to the organic salt may be replaced by a mono- or polyhydroxylated group. Modified organophilic clays containing these compounds swell and gel in organic liquids without the need for polar dispersion additives. For example, European Patent Application 0,133,071 describes modified organophilic clays resulting from the combination of a smectite clay, a quaternary ammonium salt having a long hydrocarbon chain, and a mono- or polyhydroxylated nitrogenous surfactant. The mono- and polyhydroxylated nitrogenous organic surfactants used in the disclosed formulations are ethoxylated amines and alkoxylated quaternary ammonium salts having long hydrocarbon chains, such as (tallow alkyl)- or di(tallow alkyl)-(methyl or benzyl) ammonium salts.

Further increases in the amount of alkoxylated groups, however, result in clay compositions that impart gelling properties to aqueous systems rather than to non-aqueous systems. For example, U.S. Pat. No. 4,677,158 describes a reaction product of a smectite clay and a quaternary ammonium compound that is used as a thickener for aqueous suspensions, particularly water based latex paints and caulks. The disclosed quaternary ammonium compound is said to consist of a nitrogen atom bonded to separate carbon chains where one chain can be a methyl group or an alkyl group containing 10 to 20 carbon atoms, and the second chain is an alkyl group containing from 10 to 22 carbon atoms or a polyoxyethylene chain. The third and fourth chains are polyoxyethylene chains such that the total number of ethylene oxide units is from 5 to 200 moles.

The disadvantages of most existing organoclay compositions for non-aqueous systems are that (a) relatively large amounts of the organoclay compositions are needed to impart the required viscosity; (b) polar activators are required in many cases to enhance their gelling properties; and (c) the organoclays are limited to either polar or non-polar systems depending upon their organic content.

SUMMARY OF THE INVENTION

A new type of organophilic clay gellant has been discovered in which the synergistic action of two or more types of organic cations derived from organic salt compounds provides improved gelling properties in organic solvents. It has been unexpectedly discovered that a defined combination and range of these two different organic salts provides an organophilic clay gellant which exhibits improved gelling properties in non-aqueous systems. Furthermore, it has been discovered that the improved gelling properties are obtained in such systems only when the second organic salt, which is a polyalkoxylated quaternary ammonium salt, is present in a defined critical amount by weight based on the total organic cation content.

The present invention provides an improved, more efficient organophilic clay gellant for gelling or thickening non-aqueous solvent-based compositions.

Thus, according to one aspect of the invention, an organophilic clay gellant is provided which comprises the reaction product of:

(a) a smectite-type clay;

(b) a first organic cation in an amount of from about 75% to about 150% of the cation exchange capacity of the smectite-type clay; and (c) a second organic cation provided by a polyalkoxylated quaternary ammonium salt in an amount of from about 0.01% to about 20% by weight of the total organic cation content.

The present invention also contemplates a process for preparing an organophilic clay gellant which comprises:
(a) preparing an aqueous slurry of a smectite-type clay;
(b) adding to the slurry:
 (i) a first organic cation in an amount of from about 75% to about 150% of the cation exchange capacity of the smectite-type clay; and
 (ii) a second organic cation provided by a polyalkoxylated quaternary ammonium salt in an amount of from about 0.01% to 20% by weight of the total organic cation content; and
(c) reacting the resulting mixture for a sufficient time to form an organophilic clay gellant.

The first and second organic cations may be added to the clay slurry separately in any order or simultaneously.

The invention also provides non-aqueous solvent compositions thickened with the above-indicated organophilic clay gellant. A third aspect of the invention therefore relates to a non-aqueous fluid system which comprises:
(a) a non-aqueous composition; and
(b) an organophilic clay gellant comprising the reaction product of:
 (i) a smectite-type clay;
 (ii) a first organic cation in an amount of from about 75% to about 150% of the cation exchange capacity of the smectite-type clay; and
 (iii) a second organic cation provided by a polyalkoxylated quaternary ammonium salt in an amount of from 0.01% to about 20% by weight of the total organic cation content.

DESCRIPTION OF THE PREFERRED EMBODIMENTS

Figure 1:
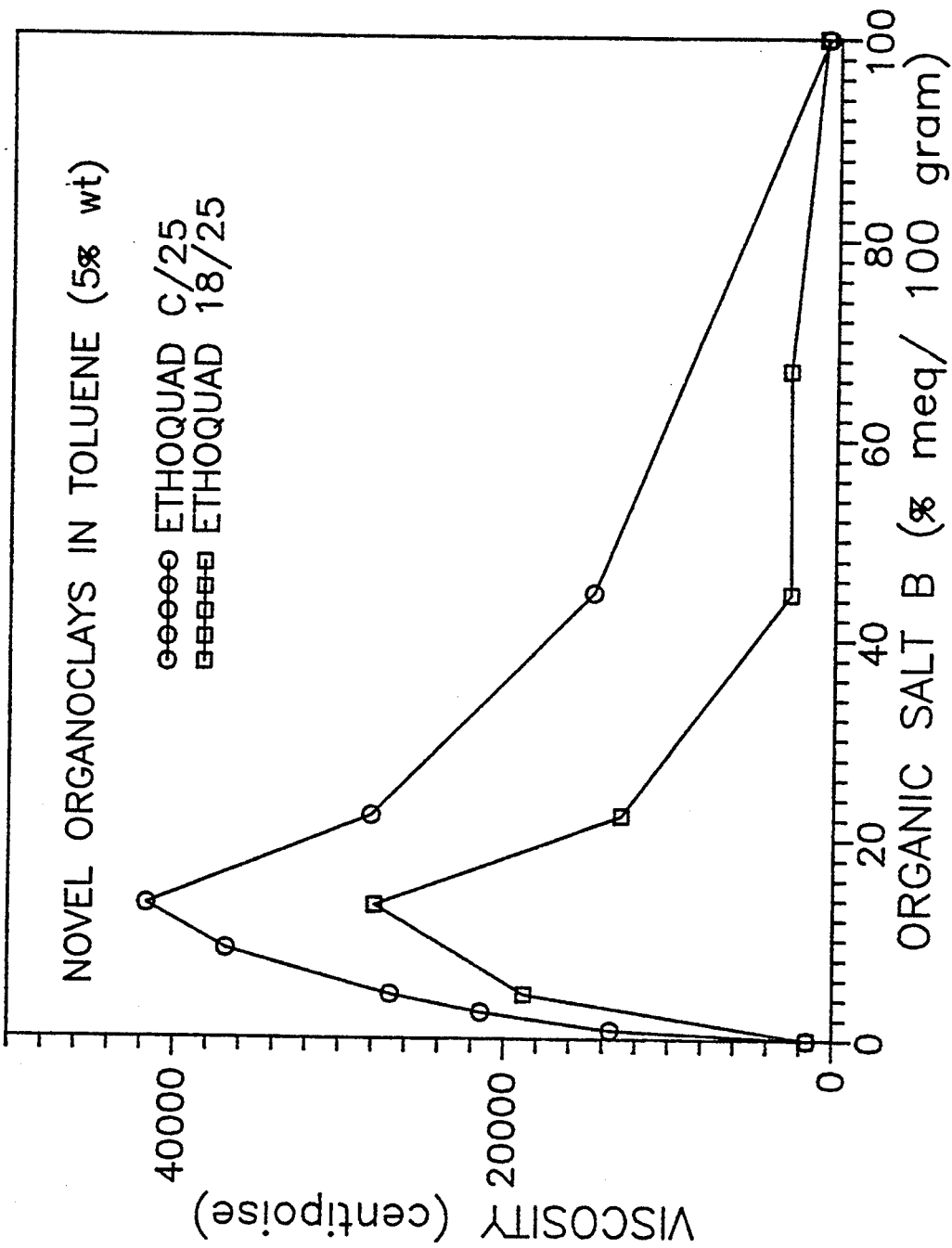
FIG. 1 is a graph showing the viscosities of the organoclays of the invention in toluene as a function of the amount of the second organic cation in the organoclay.

As stated above, one aspect of the present invention relates to an improved, more efficient organophilic clay gellant. The organophilic clay is prepared by reacting a smectite-type clay with a first organic cation and a second organic cation provided by a polyalkoxylated quaternary ammonium salt.

According to a first aspect of the invention, an organophilic clay gellant is provided which comprises the reaction product of:
(a) a smectite-type clay;
(b) a first organic cation in an amount of from about 75% to about 150% of the cation exchange capacity of the smectite-type clay; and
(c) a second organic cation provided by a polyalkoxylated quaternary ammonium salt in an amount of from about 0.01% to about 20% by weight of the total organic cation content.

The clay which is used in the present invention is a smectite-type clay having a cationic exchange capacity of at least 75 milliequivalents per 100 grams of clay as determined by the well-known ammonium acetate method.

Smectite-type clays are well known in the art and are commercially available from a variety of sources. Prior to use in the formulations of the instant invention, the clays are preferably converted to the sodium form if they are not already in this form. This may be conveniently carried out by preparing an aqueous clay slurry and passing the slurry through a bed of cation exchange resin in the sodium form. Alternatively, the clay can be mixed with water and a soluble sodium compound, such as sodium carbonate, sodium hydroxide, etc., and the mixture sheared, such as with a pugmill or extruder. Conversion of the clay to the sodium form can be undertaken at any point before reaction with the reagents of the invention.

Smectite-type clays prepared synthetically by either a pneumatolytic or, preferably, a hydrothermal synthesis process may also be used to prepare the novel organic clay complexes of the invention.

Representative of smectite-type clays useful in accordance with the present invention are the following:

Montmorillonite

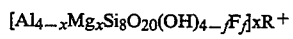

where $0.55 \leq x \leq 1.10$, $f \leq 4$ and R is selected from the group consisting of Na, Li, NH$_4$, and mixtures thereof;

Bentonite

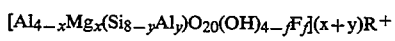

where $0 < x < 1.10$, $0 < y < 1.10$, $0.55 \leq (x+y) \leq 1.10$, $f \leq 4$ and R is selected from the group consisting of Na, Li, NH$_4$, and mixtures thereof; cl Beidellite

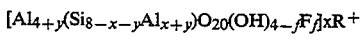

where $0.55 \leq x \leq 1.10$, $0 \leq y \leq 0.44$, $f \leq 4$ and R is selected from the group consisting of Na, Li, NH$_4$, and mixtures thereof;

Hectorite

where $0.57 \leq x \leq 1.15$, $f \leq 4$ and R is selected from the group consisting of Na, Li, NH$_4$, and mixtures thereof;

Saponite

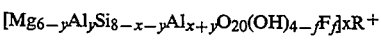

where $0.58 \leq x \leq 1.18$, $0 \leq y \leq 0.66$, $f \leq 4$ and R is selected from the group consisting of Na, Li, NH$_4$, and mixtures thereof; and Stevensite

where $0.28 \leq x \leq 0.57$, $f = 4$ and R is selected from the group consisting of Na, Li, NH$_4$, and mixtures thereof.

The preferred clays used in the present invention are bentonite and hectorite. In addition, it will be understood that the above-listed smectite-type clays which have been subjected to the application of shear may also be used.

To achieve shearing of the smectite-type clay, the clay is typically dispersed in water at a concentration of from about 0.5 to about 80% by weight. The slurry may optionally be first centrifuged to remove non-clay impurities which constitute about 10% to about 50% of the starting clay composition. Of course, if the clay has previously been treated to remove impurities, such as by the clay vendor, the treated clay can be formed into a slurry and subjected to shear conditions. Shear can be imparted by means of commercially available equipment that is known to impart high shear to the material. Illustrative of such equipment are a Manton-Gaulin homogenizer available from Manton-Gaulin Company, a Tekmar SD-45 homogenizer available from Tekmar Company, a Sharples Super Centrifuge available from Sharples Division of Pennwalt Corporation, an Oakes mill available from Oakes Machinery, a Waring Blendor available from Waring Products, a Microfluidizer available from Microfluidics Corporation, a division of Biotechnology Corporation, and similar devices which can impart high laminar and turbulent shear to the clay slurry. Exemplary conditions using a Manton-Gaulin homogenizer are a pressure in the range of from about 500 to about 8,000 psi with one or more passes of the clay slurry through the homogenizer. Representative processes for shearing clay slurries are described in U.S. Pat. No. 4,695,402 and 4,472,098, both of which are incorporated herein by reference.

The smectite-type clays may be synthesized hydrothermally by forming an aqueous reaction mixture in the form of a slurry containing mixed hydrous oxides or hydroxides of the desired metals with or without sodium (or alternate exchangeable cation or mixture thereof) and fluoride in the proportions defined by the above formulas and the preselected values of x, y and f for the particular synthetic smectite desired. The slurry is then placed in an autoclave and heated under autogenous pressure to a temperature within the range of approximately 100° to 325° C., preferably 275° to 300° C., for a sufficient period of time to form the desired product. Formulation times of 3 to 48 hours are typical at 300° C. depending upon the particular smectite-type clay being synthesized. The optimum time can be readily determined by pilot trials.

Representative hydrothermal processes for preparing synthetic smectite clays are described in U.S. Pat. Nos. 3,252,757; 3,586,478; 3,666,407; 3,671,190; 3,844,978; 3,844,979; 3,852,405 and 3,855,147, all of which are incorporated herein by reference.

The organic salts which are useful in this invention may be selected from a variety of materials that are capable of forming an organoclay by exchange of cations with the smectite-type clay. The organic cations which are reacted with the smectite-type clay must have a positive charge localized on a single atom or on a small group of atoms within the compound. For example, the cation may be provided by a compound selected from the group consisting of quaternary ammonium salts, phosphonium salts, sulfonium salts, and mixtures thereof. The first organic cation is preferably a cation which contains at least one linear or branched, saturated or unsaturated alkyl group having 12 to 22 carbon atoms. The remaining groups of the cation may be selected from the group consisting of (a) linear or branched aliphatic, alicyclic or aromatic groups having 1 to 22 carbon atoms; (b) aralkyl groups which are benzyl and substituted benzyl moieties including fused ring moieties having linear chains or branches of 1 to 22 carbon atoms in the alkyl portion of the structure; (c) aryl groups such as phenyl and substituted phenyl including fused ring aromatic substituents; (d) beta, gamma-unsaturated groups having six or less carbon atoms or hydroxyalkyl groups having 2 to 6 carbon atoms; and (e) hydrogen.

The long chain alkyl radicals may be derived from naturally occurring oils including various vegetable oils, such as corn oil, coconut oil, soybean oil, cottonseed oil, castor oil and the like, as well as various animal oils or fats such as tallow oil. The alkyl radicals may likewise be petrochemically derived from, for example, alpha olefins.

Representative examples of useful branched, saturated radicals include 12-methylstearyl and 12-ethylstearyl. Representative examples of useful branched, unsaturated radicals include 12-methyloleyl and 12-ethyloleyl. Representative examples of unbranched, saturated radicals include lauryl; stearyl; tridecyl; myristyl (tetradecyl); pentadecyl; hexadecyl; and hydrogenated tallow, docosanyl. Representative examples of unbranched, unsaturated and unsubstituted radicals include oleyl, linoleyl, linolenyl, soya and tallow.

Additional examples of aralkyl, that is benzyl and substituted benzyl moieties, include those materials derived from, e.g., benzyl halides, benzhydryl halides, trityl halides, alpha-halo-alpha-phenylalkanes wherein the alkyl chain has from 1 to 22 carbon atoms, such as 1-halo-1-phenylethane, 1-halo-1-phenyl propane, and 1-halo-1-phenyloctadecane; substituted benzyl moieties, such as those derived from ortho-, meta- and para-chlorobenzyl halides, para-methoxy-benzyl halides, ortho-, meta- and para-nitrilobenzyl halides, and ortho-, meta- and para-alkylbenzyl halides wherein the alkyl chain contains from 1 to 22 carbon atoms; and fused ring benzyl-type moieties, such as those derived from 2-halomethylnaphthalene, 9-halomethylanthracene and 9-halomethylphenanthrene, wherein the halo group comprises chloro, bromo, iodo, or any other such group which serves as a leaving group in the nucleophilic attack of the benzyl type moiety such that the nucleophile replaces the leaving group on the benzyl type moiety.

Examples of aryl groups that are useful in the first organic cation include phenyl and substituted phenyl, N-alkyl and N,N-dialkyl anilines, wherein the alkyl groups contain between 1 and 22 carbon atoms; ortho-, meta- and para-nitrophenyl, ortho-, meta- and para-alkyl phenyl, wherein the alkyl group contains between 1 and 22 carbon atoms, 2-, 3-, and 4-halophenyl wherein the halo group is defined as chloro, bromo, or iodo, and 2-, 3-, and 4-carboxyphenyl and esters thereof, where the alcohol of the ester is derived from an alkyl alcohol, wherein the alkyl group contains between 1 and 22 carbon atoms, aryl such as a phenol, or aralkyl such as benzyl alcohols; fused ring aryl moieties such as naphthalene, anthracene, and phenanthrene.

The beta, gamma unsaturated alkyl group which may be included in the first organic cation component of the organophilc clay gellants of the invention may be selected from a wide range of materials well known in the art. These compounds may be cyclic or acyclic, unsubstituted or substituted with aliphatic radicals containing up to 3 carbon atoms such that the total number of aliphatic carbons on the beta, gamma unsaturated radical is 6 or less. The beta, gamma unsaturated alkyl radical may be substituted with an aromatic ring that likewise is conjugated with the unsaturation of the beta, gamma moiety or the beta, gamma radical may be substituted with both aliphatic radicals and aromatic rings.

Representative examples of cyclic beta, gamma unsaturated alkyl groups include 2-cyclohexenyl and 2-cyclopentenyl. Representative examples of acyclic beta, gamma unsaturated alkyl groups containing 6 or less carbon atoms include propargyl; allyl(2-propenyl); crotyl(2-butenyl); 2-pentenyl; 2-hexenyl; 3-methyl-2-butenyl; 3-methyl-2-pentenyl; 2,3-dimethyl-2-butenyl; 1,1-dimethyl-2-propenyl; 1,2-dimethyl propenyl; 2,4-pentadienyl; and 2,4-hexadienyl. Representative examples of acyclic-aromatic substituted compounds include cinnamyl(3-phenyl-2 propenyl); 2-phenyl-2-propenyl; and 3-(4-methoxyphenyl)-2-propenyl. Representative examples of aromatic and aliphatic substituted materials include 3-phenyl-2-cyclohexenyl; 3-phenyl-2-cyclopentenyl; 1,1-dimethyl-3-phenylpropenyl; 1,1,2-trimethyl-3-phenyl-2-propenyl; 2,3-dimethyl-3-phenyl-2-propenyl; 3,3-dimethyl-2-phenyl-2-propenyl; and 3-phenyl-2-butenyl.

The hydroxyalkyl group may be selected from a hydroxyl substituted aliphatic radical wherein the hydroxyl is not substituted at the carbon atom adjacent to the positively charged atom; the group has from 2 to 6 aliphatic carbon atoms. The alkyl group may be substituted with an aromatic ring independently from the 2 to 6 aliphatic carbons. Representative examples include 2-hydroxyethyl; 3-hydroxypropyl; 4-hydroxypentyl; 6-hydroxyhexyl; 2-hydroxypropyl; 2-hydroxybutyl; 2-hydroxypentyl; 2-hydroxyhexyl; 2-hydroxycyclohexyl; 3-hydroxycyclohexyl; 4-hydroxycyclohexyl; 2-hydroxycyclopentyl; 3-hydroxycyclopentyl; 2-methyl-2-hydroxypropyl; 1,1,2-trimethyl-2-hydroxypropyl; 2-phenyl-2-hydroxyethyl; 3-methyl-2-hydroxybutyl; and 5-hydroxy-2-pentenyl.

The first organic cation can therefore be provided by a compound selected from the group consisting of at least one of the following formulae:

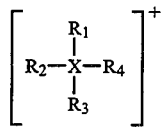

and

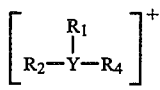

wherein X is nitrogen or phosphorous, Y is sulfur, $R_1$ is a linear or branched, saturated or unsaturated alkyl group having 12 to 22 carbon atoms and $R_2$, $R_3$ and $R_4$ are independently selected from the group consisting of (a) linear or branched alkyl groups having 1 to 22 carbon atoms; (b) aralkyl groups which are benzyl and substituted benzyl moieties including fused ring moieties having linear chains or branches of 1 to 22 carbon atoms in the alkyl portion of the structure; (c) aryl groups such as phenyl and substituted phenyl including fused ring aromatic substituents; (d) beta, gamma unsaturated groups having six or less carbon atoms or hydroxyalkyl groups having 2 to 6 carbon atoms; and (e) hydrogen.

The anion which will normally accompany the organic cation is typically one that will not adversely affect the reaction product or the recovery of the same. Such anions include, for example, chloride, bromide, iodide, hydroxyl, nitrite and acetate, used in amounts sufficient to neutralize the organic cation.

The preparation of the first organic cationic salt can be achieved by techniques well-known in the art. For example, when preparing a quaternary ammonium salt, one skilled in the art would prepare a dialkyl secondary amine, for example, by the hydrogenation of nitriles, see U.S. Pat. No. 2,355,356, and then form the methyl dialkyl tertiary amine by reductive alkylations using formaldehyde as a source of the methyl radical. According to procedures set forth in U.S. Pat. No. 3,136,819 and U.S. Pat. No. 2,775,617, a quaternary amine halide may then be formed by adding benzyl chloride or benzyl bromide to the tertiary amine. The disclosure of the above three patents are incorporated herein by reference.

As is well known in the art, the reaction of the tertiary amine with benzyl chloride or benzyl bromide may be completed by adding a minor amount of methylene chloride to the reaction mixture so that a blend of products which are predominantly benzyl substituted is obtained. This blend may then be used without further separation of components to prepare the organophilic clay.

Illustrative of the numerous patents which describe organic salts, their manner of preparation and their use in the preparation of organophilic clays are commonly assigned U.S. Pat. Nos. 2,966,506; 4,081,496; 4,105,578; 4,116,866; 4,208,218; 4,391,637; 4,410,364; 4,412,018; 4,434,075; 4,434,076; 4,450,095 and 4,517,112, the contents of which are incorporated herein by reference.

The instant invention is based on the unexpected discovery that the combination of organic salts in defined amounts provides a synergistic effect in which the organoclay complex containing the organic salts imparts improved viscosity to non-aqueous systems containing the organoclay complex. The organophilic clay gellant provided by the invention imparts a higher viscosity to non-aqueous systems than is achieved by separately adding an organophilic clay gellant containing only the first organic cation of the invention and a second organophilic clay gellant containing only the second organic cation of the invention at a given concentration.

The second organic cation utilized in the products of the invention comprises a quaternary ammonium salt which contains alkoxy moieties. The second organic cation contains at least two linear or branched alkoxylated groups containing at least two carbon atoms and one oxygen atom.

The second compound is preferably an agent having the following general formula:

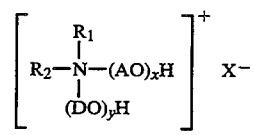

wherein $R_1$ and $R_2$ are independently selected from the group consisting of (a) linear or branched alkyl groups having 1 to 22 carbon atoms; (b) aralkyl groups which are benzyl and substituted benzyl moieties including fused ring moieties having linear chains or branches of 1 to 22 carbon atoms in the alkyl portion of the structure; (c) aryl groups such as phenyl and substituted phenyl including fused ring aromatic substituents; and (d) beta, gamma unsaturated groups having six or less carbon atoms or hydroxyalkyl groups having 2 to 6 carbon atoms; x and y are the number of repeating alkyl oxide groups and the total x+y may be 2 to 200. The alkyl oxide (AO, DO) groups may include two to eight carbon atoms such as ethyl, propyl, butyl, pentyl, etc.

The salt anion may be selected from the group consisting of halogen anions, preferably chloride and bromide, hydroxide, acetate, nitrite, and the like and mixtures thereof. These anions are required to have a charge such that they neutralize the alkoxylated quaternary ammonium salt.

Illustrative examples of suitable alkoxylated quaternary ammonium chloride compounds include those available under the tradename Ethoquad from Akzo Chemie America, namely, methyl bis(2-hydroxyethyl) cocoalkyl ammonium chloride, methyl bis(polyoxyethylene [15]) cocoalkyl quaternary ammonium chloride, methyl bis(2-hydroxyethyl) oleyl ammonium chloride, methyl bis(polyoxyethylene [15]) oleyl quaternary ammonium chloride, methyl bis(2-hydroxyethyl) octadecyl ammonium chloride, and methyl bis(polyoxyethylene [15]) octadecyl quaternary ammonium chloride, wherein the numbers in brackets refer to the total number of ethylene oxide units. The second organic cation provided by a polyalkoxylated quaternary ammonium salt is in an amount of from 0.01 to about 20% by weight of the total organic cation content.

The present invention also contemplates a process for preparing an organophilic clay gellant which comprises:
(a) preparing an aqueous slurry of a smectite-type clay;
(b) adding to said slurry:
 (i) a first organic cation in an amount of from about 75% to about 150% of the cation exchange capacity of the smectite-type clay; and
 (ii) a second organic cation provided by a polyalkoxylated quaternary ammonium salt; and
(c) reacting the resulting mixture for a sufficient time to form an organophilic clay gellant.

The organoclays of this invention may be prepared by admixing the clay, organic salts and water together, preferably at temperatures within the range from 20° C. to 100 ° C., and most preferably from 35° C. to 80° C., for a period of time sufficient for the organic compounds to react with the clay. The reaction is typically followed by filtering, washing, drying and, if required, grinding. The organic salts may be added simultaneously or at required intervals (that is, the hydrophobic organic salt first followed by the hydrophilic organic salt or vice versa), to allow full interaction with the clay.

The clay is preferably dispersed in water at a concentration from about 1 to 80%, most preferably from 2 to 8%. Optionally, the slurry may be centrifuged to remove non-clay impurities which may constitute about 10% to 50% of the starting clay composition.

The amount of organic salts added to the clay for purposes of this invention must be sufficient to impart to the clay the improved gelling and dispersion characteristics. This amount is defined as the milliequivalent ratio, which is the number of milliequivalents (m.e.) of the organic salt in the organoclay per 100 grams of clay, 100% active clay basis.

The organophilic clay gellants prepared according to this invention may be used as theological additives in non-aqueous compositions such as paints, varnishes, enamels, waxes, paint-varnish, lacquer removers, oil base drilling fluids, lubricating grease, inks, polyester resins, epoxy resins, mastices, adhesives, sealants, cosmetics, detergents, and the like. These fluids are prepared by any conventional method as described in U.S. Pat. No. 4,208,218 including colloid mills, roller mills, ball mills and high speed dispersers. Consequently, the invention also provides non-aqueous solvent compositions thickened with the above-indicated organophilic clay gellant. Thus, a third aspect of the invention relates to a non-aqueous fluid system which comprises:
(a) a non-aqueous composition; and
(b) an organophilic clay gellant comprising the reaction product of:
 (i) a smectite-type clay;
 (ii) a first organic cation in an amount of from about 75% to about 150% of the cation exchange capacity of the smectite-type clay; and
 (iii) a second organic cation provided by a polyalkoxylated quaternary ammonium salt in an amount of 0.01% to about 20% by weight of the total organic cation content.

The organophilic clay complexes of the invention are added to the non-aqueous compositions in amounts sufficient to obtain the desired rheological properties. Amounts of the organophilic clay complexes in the non-aqueous compositions are from about 0.01% to 15%, preferably from about 0.3% to 5%, based on the total weight of the non-aqueous fluid system.

The following examples are given to illustrate the invention, but are not deemed to be limiting thereof. All percentages given throughout the specification are based upon weight unless otherwise indicated. It should be noted that Organic Salts A and B referred to in the following examples provide the first and second organic cations, respectively, of these inventive formulations.

EXAMPLE 1

This Example illustrates the preparation of an organophilic clay gellant according to the present invention.

45.00 grams of dried bentonite clay, which has been previously treated in water by centrifugation to remove non-clay impurities and ion-exchanged to provide the clay in sodium form, is mixed with water to form a 3% by weight slurry of clay in water. The slurry is heated to 70° C. in a reaction flask of suitable size equipped with a stirrer, thermometer and addition funnel. 2.08 grams of methyl bis(polyoxyethylene [15]) cocoalkyl quaternary ammonium chloride commercially available as Ethoquad C/25 from Akzo Chemie (5 milliequivalents per 100 grams of clay solids) dissolved in 10 grams of isopropyl alcohol is added to the clay slurry. The mixture is stirred at 70° C. for 1 hour. 20.18 grams of benzyl dimethyl monohydrogenated tallow quaternary ammonium chloride (107 milliequivalents per 100 grams of clay solids) dissolved in 150 grams of isopropanol at about 60° C. is added to the mixture. The mixture is stirred for another hour at 70° C. The product is filtered through a Buchner funnel to collect the solids. The wet solids are reslurried in 1500 grams of water at 70° C. for 20 minutes and then recollected on a Buchner funnel. The filtercake is dried in a 60° C. oven for 16 hours.

COMPARATIVE EXAMPLE A

For comparative purposes, the procedure of Example 1 is repeated, except that the second quaternary ammonium chloride is omitted. Benzyl dimethyl monohydrogenated tallow quaternary ammonium chloride is the only organic salt used.

COMPARATIVE EXAMPLE B

For comparative purposes, the procedure of Example 1 is repeated, except that the first organic salt is omitted. Methyl bis(polyoxyethylene [15]) cocoalkyl quaternary ammonium chloride is the only organic salt added.

EXAMPLE 2

The procedure of Example 1 is repeated, except that the first organic salt is dimethyl dihydrogenated tallow quaternary ammonium chloride. The second organic salt is methyl bis(polyoxyethylene [15]) cocoalkyl quaternary ammonium chloride.

EXAMPLE 3

This Example illustrates the preparation of an organophilic clay gellant according to the invention, wherein the first and second organic cations are added simultaneously to the smectite-type clay slurry.

45.00 grams of dried bentonite clay, which has been previously treated in water by centrifugation to remove non-clay impurities and ion-exchanged to provide the clay in sodium form, is mixed with water to make a 3% by weight slurry of clay in water. The slurry is heated to 70° C. in a reaction flask of suitable size equipped with a stirrer, thermometer and addition funnel. 2.08 grams of methyl bis(polyoxyethylene [15]) cocoalkyl quaternary ammonium chloride (5 meq/100 grams), 27.20 grams of commercially available dimethyl dihydrogenated tallow quaternary ammonium chloride (107 meq/100 grams) are dissolved in 110 grams of isopropyl alcohol at 60° C. and added to the reaction flask. The reaction mixture is stirred for one hour at 70° C. and then filtered through a Buchner funnel to collect the solids. The wet solids are reslurried in 1500 grams of water at 70° C. for 20 minutes and then recollected on a Buchner funnel. The filtercake is dried at 60° C. in an oven for 16 hours.

EXAMPLE 4

This Example illustrates the preparation of an organophilic clay gellant according to the invention using a sheared smectite-type clay.

About 2.5 gallons of a 3.0% solids slurry of bentonite clay in water, which has been previously treated by centrifugation to remove non-clay impurities and ion-exchanged to provide the clay in the sodium form, is passed through a Manton-Gaulin homogenizer at 5,000 psi pressure. 1500 grams of this slurry is placed in a reaction vessel of suitable size equipped with a stirrer, thermometer, and addition funnel. The clay slurry is heated to 70° C. 2.08 grams of methyl bis(polyoxyethylene [15]) cocoalkyl quaternary ammonium chloride (5 meq/100 grams) dissolved in 10 grams of isopropyl alcohol is added to the clay slurry. The mixture is stirred at 70° C. for one hour. 27.20 grams of dimethyl dihydrogenated tallow quaternary ammonium chloride (107 meq/100 grams) which has been dissolved in 100 grams of isopropyl alcohol at about 60° C. is added to the mixture. The reaction mixture is stirred for one additional hour at 70° C. and then filtered through a Buchner funnel to collect the solids. The wet solids are reslurried in 1500 grams of water at 70° C. for 20 minutes and then recollected on a Buchner funnel. The filtercake is dried at 60° C. in an oven for 16 hours.

EXAMPLES 5–13

The compositions are prepared according to the procedure set forth in Example 1 (or Example 4 for sheared clay) except that different amounts of the methyl bis(polyoxyethylene [15]) cocoalkyl quaternary ammonium chloride (commercially available from Akzo Chemie as Ethoquad C/25) (Organic Salt B) and commercially available benzyl dimethyl monohydrogenated tallow quaternary ammonium chloride (Organic Salt A) are used as shown in Table 1.

EXAMPLES 14–21

The compositions are prepared according to the procedure set forth in Example 2 (or Example 4 for sheared clay) except that different amounts of the methyl bis(polyoxyethylene [15]) cocoalkyl quaternary ammonium chloride (commercially available from Akzo Chemie as Ethoquad C/25) (Organic Salt B) and commercially available dimethyl dihydrogenated tallow quaternary ammonium chloride (Organic Salt A) are used as shown in Table 2.

EXAMPLES 22–30

The compositions prepared according to Examples 1 to 21, and Comparative Examples A and B, are dissolved in toluene to form 5% solutions (by weight) by mixing 5 grams of the organophilic gellant in 100 grams toluene using a Tekmar homogenizer at 1000 rpm. The viscosities of the solutions were tested in a Bohlin VOR Rheometer at 25° C. at a shear rate of 1.846 1/S (reciprocal seconds). The viscosities are shown in Table 3.

EXAMPLES 31–35

The compositions are prepared according to Examples 1 to 21, except that methyl bis(polyoxyethylene [15]) octadecyl quaternary ammonium chloride (commercially available from Akzo Chemie as Ethoquad 18/25) is substituted for methyl bis(polyoxyethylene [15] cocoalkyl quaternary ammonium chloride (Ethoquad C/25). The viscosities of 5% (by weight) solutions of these compositions in toluene are shown in Table 4.

The viscosities of Examples 22–35 are shown in FIG. 1 as a function of the amount of organic salt B; the amounts of organic salt B in relation to the total amount of cation show significantly increased effectiveness in the range of 0.01% to about 20% by weight of the total organic cation content.

EXAMPLES 36–42

These examples demonstrate the viscosity and other typical coating properties provided when the novel organoclays of the invention, as described in Examples 5– 13 and Comparative Example A, are used in an alkyl resin aromatic paint formulation. A typical formulation is prepared according to Formulation 1.

| Formulation 1 Alkyd Resin Aromatic Paint Formula | | | |
|---|---|---|---|
| Ingredients | Description | Manufacturer | Amount (Pounds) |
| MILLBASE: | | | |
| Duramac 2434 | Short Medium Oil Alkyd | McWhorter | 160.00 |
| Xylene | Solvent | Ashland Chemical | 20.00 |
| Organoclay | — | — | 10.00 |
| MeOH/H$_2$O 95/5 | Polar Activiation | — | 3.00 |

-continued

Formulation 1
Alkyd Resin Aromatic Paint Formula

| Ingredients | Description | Manufacturer | Amount (Pounds) |
|---|---|---|---|
| Mix @ 3000 rpm 5 minutes. | | | |
| Disperse Ayd 1 | Wetting Agent | Daniel Products | 5.00 |
| TITANOX 2101 | Titanium Dioxide | KRONOS | 280.00 |
| Disperse @ 5400 rpm 15 minutes. | | | |
| LETDOWN: | | | |
| Duramac 2434 | Short Medium Oil Alkyd | McWhorten | 440.00 |
| Xylene | Solvent | Ashland Chem. | 113.50 |
| 6% Cobalt Naphthenate | Drier | Nuodex | 4.00 |
| Exkin #2 | Antiskinning Agent | Nuodex | 1.00 |
| | | Total | 1036.50 |

Formulation 2
Soya News Red Ink Formula

| Ingredient | Generic Name | Manufacturer | Formulation (parts by wt.) |
|---|---|---|---|
| LR 6247 SB Lithol Rubine | Flushed Color | Magruder Color | 26.4 |
| Special T Blown Soya Oil | Oxidized Soya Bean Oil $Z_2$-$Z_4$ | Spencer-Kellogg Div. of Reichhold Chemicals | 40.5 |
| Mix at 8000 rpm until uniform, then add: | | | |
| Organoclay | | | 3.8 |
| Disperse at 8000 rpm for 20 minutes, then add as letdown: | | | |
| Superior Soya Oil | Highly Refined Soybean Oil A | Spencer-Kellogg Div. of Reichhold Chemicals | 29.1 |
| | | Total | 99.8 |

The viscosity is determined using a Brookfield Viscometer with a No. 5 spindle in accordance with ASTM D2196-86. Thixotropic index is calculated as the ratio between the viscosity at 10 rpm and the viscosity at 100 rpm. Krebs Units (KU) are measured using a Stormer Viscometer in accordance with ASTM D562-81. Sag resistance is measured using a Leneta multi-notch applicator in accordance with ASTM D4400-84. The results of Examples 36–42 are shown in Table 5.

EXAMPLES 43–48

These examples demonstrate viscosity and other typical coating properties provided when the novel organoclays of the invention as described in Examples 1–21 and Comparative Example A, are used in Formulation 1, except that methyl bis(polyoxyethylene [15]) octadecyl quaternary ammonium chloride (Ethoquad 18/25) is used instead of methyl bis(polyoxyethylene [15]) cocoalkyl quaternary ammonium chloride (Ethoquad C/25). The results of these examples are set forth in Table 6.

Figure 2:
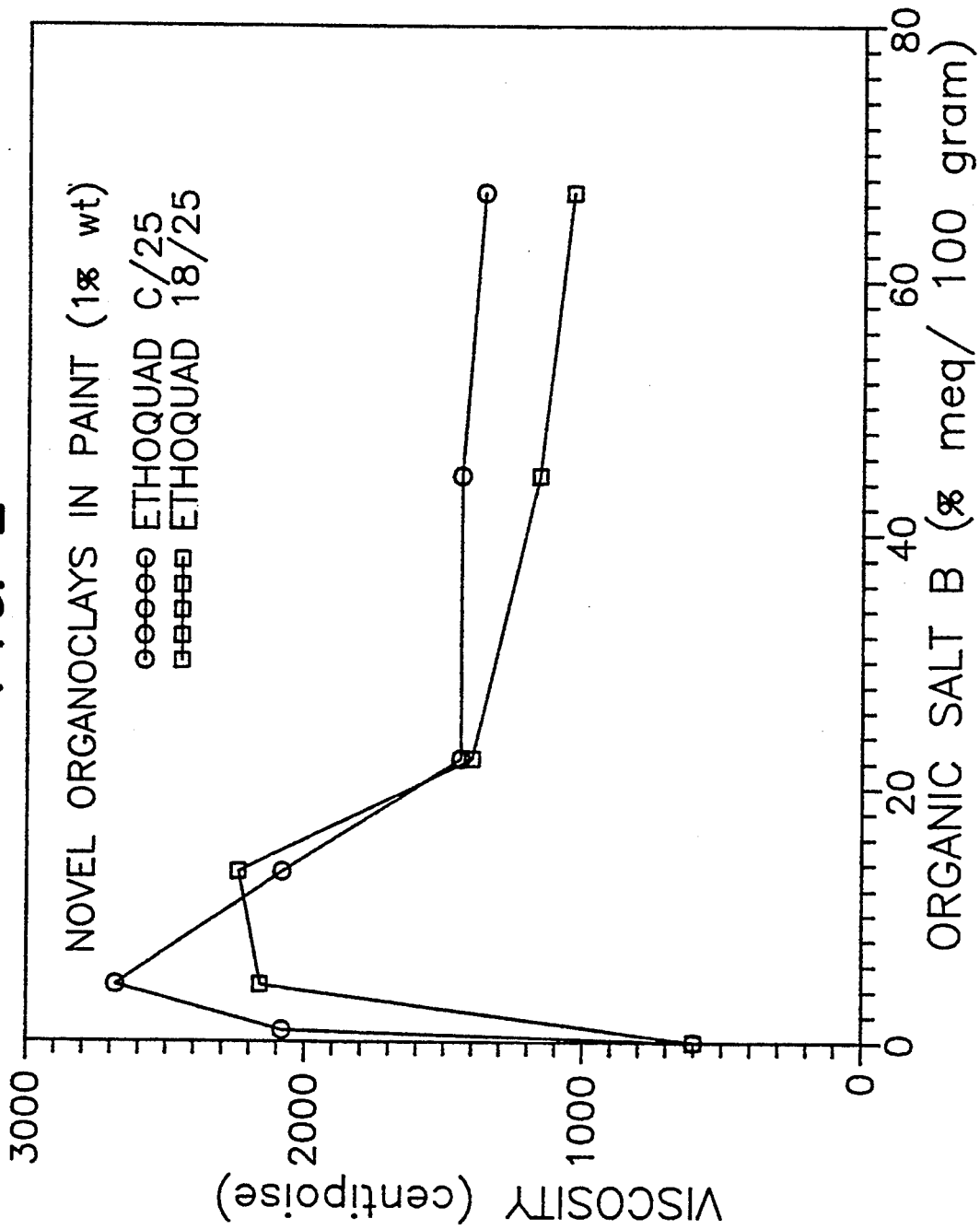
FIG. 2 is a graph showing the viscosities of the organoclays of the invention in paint as a function of the amount of the second organic cation in the organoclay.

The viscosity of paints of Examples 36–48 containing the compositions is shown in FIG. 2 as a function of the amount of Organic Salt B.

EXAMPLES 49–54

These examples demonstrate viscosity and other typical coating properties provided when the novel organoclays of the invention are used with different organic salts B in Formulation 1.

The particular salts employed, together with the results of these examples, are shown in Table 7.

EXAMPLES 55–56

These examples demonstrate that the novel organoclay compositions of the invention do not require a polar activator in order to enhance their efficiency. In these examples, the MeOH/H$_2$O 95/5 component is removed from Formulation 1.

The results are set forth in Table 8.

EXAMPLES 57–60

These examples demonstrate the dispersion and viscosity-build properties provided when the novel organoclays of the invention are used in a soya bean oil ink formulation. A soya oil based news red ink is prepared according to Formulation 2.

A red ink is prepared according to Formulation 2. The ink is allowed to equilibrate at room temperature for 24 hours. Tack and misting are measured with a Thwing-Albert Inkometer operating at 1200 rpm and 90° F. Tack is measured according to ASTM Method D4361-84 entitled "Apparent Tack of Printing Inks by the Inkometer."

NPIRI (National Printing Ink Research Institute) grind values are measured to evaluate dispersion according to ASTM Method D1316-68 entitled "Fineness of Grind of Printing Inks by the Production Grindometer." Dispersion ratings are presented in Table 9. The ink is rated for overall scratches and background haze. A dispersion rating of medium heavy indicates poor dispersion resulting in many scratches and a medium to heavy background haze. A rating of light indicates better dispersion properties although some background haze is evident.

Viscosity for the ink formulations are determined using a Brookfield RVT Viscometer with a No. 15 spindle. Dispersion measurements, Brookfield viscosities, tack, and misting are presented in Table 9.

Based on the foregoing results, it is apparent that the organophilic clay gellants provided by the invention are highly effective in improving the theological properties of non-aqueous systems. Without wishing to be bound by any particular theory, it is believed that the presence of the polyalkoxylated quaternary ammonium cation is required in order to impart a desired hydrophobic/hydrophilic balance to the non-aqueous system to improve the efficacy of the gellant.

The invention thus being described, it will be obvious that the same may be varied in many ways. Such variations are not to be regarded as a departure from the spirit and scope of the invention and all such modifications are intended to be included within the scope of the claims.

TABLE 1

| Example | Organic Salt A* meq/100 grams** | Organic Salt B* meq/100 grams** | Clay |
|---|---|---|---|
| 5 | 111 | 1 | Bentonite |
| 1 | 107 | 5 | Bentonite |
| 6 | 102 | 10 | Bentonite |
| 7 | 87 | 25 | Bentonite |
| 8 | 62 | 50 | Bentonite |
| 9 | 111 | 1 | Bentonite (sheared) |
| 10 | 107 | 5 | Bentonite (sheared) |
| 11 | 102 | 10 | Bentonite (sheared) |

TABLE 1-continued

| Example | Organic Salt A* meq/100 grams** | Organic Salt B* meq/100 grams** | Clay |
|---|---|---|---|
| 12 | 87 | 25 | Bentonite (sheared) |
| 13 | 62 | 50 | Bentonite (sheared) |

*Organic Salt A is a commercial grade benzyl dimethyl monohydrogenated tallow quaternary ammonium chloride. Organic Salt B is methyl bis(polyoxyethylene [15]) cocoalkyl quaternary ammonium chloride (Ethoquad C/25).
**meq/100 grams is milliequivalents per 100 grams of clay solids.

TABLE 2

| Example | Organic Salt A* meq/100 grams | Organic Salt B* meq/100 grams | Clay |
|---|---|---|---|
| 14 | 111 | 1 | Bentonite |
| 2 | 107 | 5 | Bentonite |
| 15 | 102 | 10 | Bentonite |
| 16 | 87 | 25 | Bentonite |
| 17 | 62 | 50 | Bentonite (sheared) |
| 18 | 111 | 1 | Bentonite (sheared) |
| 4 | 107 | 5 | Bentonite (sheared) |
| 19 | 102 | 10 | Bentonite (sheared) |
| 20 | 87 | 25 | Bentonite (sheared) |
| 21 | 62 | 50 | Bentonite (sheared) |

*Organic Salt A is a commercial grade dimethyl dihydrogenated tallow quaternary ammonium chloride. Organic Salt B is methyl bis(polyoxyethylene [15]) cocoalkyl quaternary ammonium chloride (Ethoquad C/25).

TABLE 3

| Example | Organic Salt* meq/100 grams A | B | Viscosity 1.846 1/S. Centipoise |
|---|---|---|---|
| 22 | 112 | — | 1,531(S) |
| 23 | 111 | 1 | 13,500 |
| 24 | 109 | 3 | 21,400 |
| 25 | 107 | 5 | 26,850 |
| 26 | 102 | 10 | 36,820 |
| 27 | 97 | 15 | 41,620 |
| 28 | 87 | 25 | 28,070 |
| 29 | 62 | 50 | 14,680 |
| 30 | — | 112 | 635(S) |

*Organic Salt A is a commercial grade benzyl dimethyl monohydrogenated quaternary ammonium chloride. Organic Salt B is methyl bis(polyoxyethylene [15] cocoalkyl quaternary ammonium chloride (Ethoquad C/25).
S = separated.

TABLE 4

| Example | Organic Salt* meq/100 grams A | B | Viscosity 1.846 1/S. Centipoise |
|---|---|---|---|
| 22 | 112 | — | 1,531(S) |
| 31 | 107 | 5 | 18,770 |
| 32 | 97 | 15 | 27,830 |
| 33 | 87 | 25 | 12,900 |
| 34 | 62 | 50 | 2,695 |
| 35 | 37 | 75 | 2,807 |
| 30 | — | 112 | 784(S) |

*Organic Salt A is a commercial grade benzyl dimethyl monohydrogenated tallow quaternary ammonium chloride. Organic Salt B is methyl bis(polyoxyethylene [15]) octadecyl quaternary ammonium chloride (Ethoquad 18/25).
S = separated.

TABLE 5

| Example | Organic Salt* meq/100 grams A | B | Brookfield (cP) 10 rpm | 100 rpm | T.I. | Stormen Viscosity (KU) | Sag (mils) |
|---|---|---|---|---|---|---|---|
| 36 | 112 | — | S | S | S | S | S |
| 37 | 111 | 1 | 2080 | 1560 | 1.33 | 94 | 9 |
| 38 | 107 | 5 | 2680 | 1964 | 1.36 | 102 | 11.5 |
| 39 | 97 | 15 | 2080 | 1616 | 1.29 | 97 | 11 |
| 40 | 87 | 25 | 1440 | 1220 | 1.18 | 89 | 8 |
| 41 | 62 | 50 | 1440 | 1256 | 1.15 | 90 | 8.5 |
| 42 | 37 | 75 | 1360 | 1244 | 1.09 | 90 | 9 |

*Organic Salt A is a commercial grade benzyl dimethyl monohydrogenated tallow quaternary ammonium chloride. Organic Salt B is methyl bis(polyoxyethylene [15]) cocoalkyl quaternary ammonium chloride (Ethoquad C/25).
S = separated.

TABLE 6

| Example | Organic Salt* meq/100 grams A | B | Brookfield (cP) 10 rpm | 100 rpm | T.I. | Stormen Viscosity (KU) | Sag (mils) |
|---|---|---|---|---|---|---|---|
| 43 | 112 | — | S | S | S | S | S |
| 44 | 107 | 5 | 2160 | 1668 | 1.29 | 97 | 10.5 |
| 45 | 97 | 15 | 2240 | 1676 | 1.34 | 97 | 11 |
| 46 | 87 | 25 | 1400 | 1200 | 1.17 | 89 | 8.5 |
| 47 | 62 | 50 | 1160 | 1012 | 1.15 | 85 | 8.5 |
| 48 | 37 | 75 | 1040 | 972 | 1.07 | 85 | 8.5 |

*Organic Salt A is a commercial grade of benzyl dimethyl monohydrogenated tallow quaternary ammonium chloride (B2MHt). Organic Salt B is methyl bis(polyoxyethylene [15]) octadecyl quaternary ammonium chloride (Ethoquad 18/25).
S = separated.

TABLE 7

| Example | Organic Salt* meq/100 grams A | B | Brookfield (cP) 10 rpm | 100 rpm | T.I. | Stormen Viscosity (KU) | Sag (mils) |
|---|---|---|---|---|---|---|---|
| 49 | 107 | 5(a) | 2080 | 1564 | 1.33 | 95 | 11 |
| 50 | 87 | 25(a) | 2040 | 1544 | 1.32 | 95 | 9 |
| 51 | 107 | 5(b) | 2040 | 1650 | 1.31 | 95 | 9 |
| 52 | 87 | 25(b) | 1520 | 1264 | 1.20 | 89 | 7 |
| 53 | 107 | 5(c) | 2200 | 1580 | 1.39 | 95 | 11.5 |
| 54 | 87 | 25(c) | 2000 | 1560 | 1.28 | 95 | 9 |

*Organic Salt A is a commercial grade of benzyl dimethyl monohydrogenated tallow quaternary ammonium chloride. Organic Salt B is:
(a) Methyl bis (2-hydroxyethyl) oleyl ammonium chloride (Ethoquad 0/12)
(b) Methyl bis (2-hydroxyethyl) octadecyl ammonium chloride (Ethoquad 18/12)
(c) Methyl bis (2-hydroxyethyl) coco ammonium chloride (Ethoquad C/12)

TABLE 8

| Example | Organic Salt* meq/100 grams A | B | Polar Activator | Brookfield (cP) 10 rpm | 100 rpm | T.I. | Stormen Viscosity (KU) | Sag (mils) |
|---|---|---|---|---|---|---|---|---|
| 49 | 107 | 5(a) | yes | 2080 | 1564 | 1.33 | 95 | 11 |
| 55 | 107 | 5(a) | no | 2080 | 1700 | 1.22 | 97 | 10 |
| 53 | 107 | 5(b) | yes | 2200 | 1580 | 1.39 | 95 | 11.5 |
| 56 | 107 | 5(b) | no | 2080 | 1536 | 1.35 | 95 | 10 |

*Organic Salt A is a commercial grade of benzyl dimethyl monohydrogenated tallow quaternary ammonium chloride. Organic Salt B is:
(a) Methyl bis (2-hydroxyethyl) oleyl ammonium chloride (Ethoquad 0/12)
(b) Methyl bis (2-hydroxyethyl) coco ammonium chloride (Ethoquad C/12)

TABLE 9

| Example | Organic Salt* Meq/100 grams A | B | Grind | Tack | Misting | Brookfield Viscosity 20 rpm | 2.5 rpm |
|---|---|---|---|---|---|---|---|
| 57 | 107 | — | 0/20 MH | 5.3 | F | 3875 | 5000 |
| 58 | 111 | 1 | 0/25 LM | 5.7 | F | 5750 | 10000 |

TABLE 9-continued

| | Organic Salt* Meq/100 grams | | | | | Brookfield Viscosity | |
|---|---|---|---|---|---|---|---|
| Example | A | B | Grind | Tack | Misting | 20 rpm | 2.5 rpm |
| 59 | 107 | 5 | 0/11 M | 6.0 | F | 6625 | 14000 |
| 60 | 102 | 10 | 0/16 M | 6.2 | F | 5375 | 9000 |

*Organic Salt A is a commercial grade of dimethyl dihydrogenated tallow quaternary ammonium chloride. Organic Salt B is methyl bis(2-hydroxyethyl) oleyl quaternary ammonium chloride (Ethoquad 0/12).
F = Fair.

What is claimed is:

1. An organophilic clay comprising the reaction product of:
   (a) a smectite-type clay selected from the group consisting of montmorillonite, bentonite, beidellite, hectorite, saponite, stevensite, and mixtures thereof;
   (b) a first organic cation provided by a compound selected from the group consisting of quaternary ammonium salts, phosphonium salts, sulfonium salts, and mixtures thereof, in an amount of from about 75% to about 150% of the cation exchange capacity of the smectite-type clay, wherein the first organic cation is not provided by a polyalkoxylated quaternary ammonium salt; and
   (c) a second organic cation provided by a polyalkoxylated quaternary ammonium salt; wherein the second organic cation is present in an amount of from about 0.01% to about 20% by weight of the total organic cation content.

2. The organophilic clay of claim 1, wherein said first organic cation is provided by a compound selected from the group consisting of:

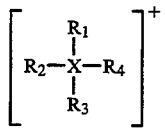

and

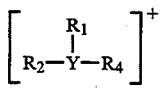

wherein X is nitrogen or phosphorous, Y is sulfur, $R_1$ is a linear or branched, saturated or unsaturated alkyl group having 12 to 22 carbon atoms and $R_2$, $R_3$ and $R_4$ are independently selected from the group consisting of (a) linear or branched alkyl groups having 1 to 22 carbon atoms; (b) aralkyl groups which are benzyl and substituted benzyl moieties including fused ring moieties having linear chains or branches of 1 to 22 carbon atoms in the alkyl portion of the structure; (c) aryl groups such as phenyl and substituted phenyl including fused ring aromatic substituents; (d) beta, gamma unsaturated groups having six or less carbon atoms or hydroxyalkyl groups having 2 to 6 carbon atoms; and (e) hydrogen.

3. The organophilic clay of claim 1, wherein said second organic cation is provided by a compound having the general formula:

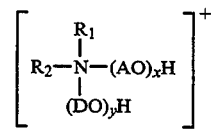

wherein $R_1$ and $R_2$ are independently selected from the group consisting of (a) linear or branched alkyl groups having 1 to 22 carbon atoms; (b) aralkyl groups which are benzyl and substituted benzyl moieties including fused ring moieties having linear chains or branches of 1 to 22 carbon atoms in the alkyl portion of the structure; (c) aryl groups such as phenyl and substituted phenyl including fused ring aromatic substituents; and (d) beta, gamma unsaturated groups having six or less carbon atoms or hydroxyalkyl groups having 2 to 6 carbon atoms; and wherein (AO) and (DO) represent alkyl oxide groups having two to eight carbon atoms; and x and y are the number of repeating alkyl oxide groups such that the total $x+y$ is a whole number from 2 to 200.

4. A process for preparing an organophilic clay which comprises:
   (a) preparing an aqueous slurry of a smectite-type clay selected from the group consisting of montmorillonite, bentonite, beidellite, hectorite, saponite, stevensite, and mixtures thereof;
   (b) adding to said slurry:
      (i) a first organic cation provided by a compound selected from the group consisting of quaternary ammonium salts, phosphonium salts, sulfonium salts, and mixtures thereof, in an amount of from about 75% to about 150% of the cation exchange capacity of the smectite-type clay, wherein the first organic cation is not provided by a polyalkoxylated quaternary ammonium salt; and
      (ii) a second organic cation provided by a polyalkoxylated quaternary ammonium salt; wherein the second organic cation is present in an amount of from about 0.01% to about 20% by weight of the total organic cation content; and
   (c) reacting the resulting mixture for a sufficient time to form an organophilic clay.

5. The process of claim 4, wherein said first organic cation is provided by a compound selected from the group consisting of:

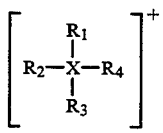

and

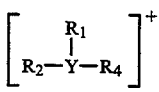

wherein X is nitrogen or phosphorous, Y is sulfur, $R_1$ is a linear or branched, saturated or unsaturated alkyl group having 12 to 22 carbon atoms and $R_2$, $R_3$ and $R_4$ are independently selected from the group consisting of (a) linear or branched alkyl groups having 1 to 22 carbon atoms; (b) aralkyl groups which are benzyl and substituted benzyl moieties including fused ring moieties having linear chains or branches of 1 to 22 carbon atoms in the alkyl portion of the structure; (c) aryl groups such as phenyl and substituted phenyl including fused ring aromatic substituents; (d) beta, gamma unsaturated groups having six or less carbon atoms or hydroxyalkyl groups having 2 to 6 carbon atoms; and (e) hydrogen.

6. The process of claim 4, wherein said second cation is provided by a compound having the general formula:

wherein $R_1$ and $R_2$ are independently selected from the group consisting of (a) linear or branched alkyl groups having 1 to 22 carbon atoms; (b) aralkyl groups which are benzyl and substituted benzyl moieties including fused ring moieties having linear chains or branches of 1 to 22 carbon atoms in the alkyl portion of the structure; (c) aryl groups such as phenyl and substituted phenyl including fused ring aromatic substituents; and (d) beta, gamma unsaturated groups having six or less carbon atoms or hydroxyalkyl groups having 2 to 6 carbon atoms; (AO) and (DO) are alkyl oxide groups having 2 to 8 carbon atoms, and $x+y$ is a whole number from 2 to 200.

7. The process of claim 4, wherein said first and second organic cations are added simultaneously to said aqueous slurry.

8. The process of claim 4, wherein said first and second organic cations are added separately to said aqueous slurry.

9. A non-aqueous fluid system which comprises:
(a) a non-aqueous composition; and
(b) an organophilic clay comprising the reaction product of:
  (i) a smectite-type clay selected from the group consisting of montmorillonite, bentonite, beidellite, hectorite, saponite, stevensite, and mixtures thereof;
  (ii) a first organic cation provided by a compound selected from the group consisting of quaternary ammonium salts, phosphonium salts, sulfonium salts, and mixtures thereof, in an amount of from about 75% to about 150% of the cation exchange capacity of the smectite-type clay, wherein the first organic cation is not provided by a polyalkoxylated quaternary ammonium salt; and
  (iii) a second organic cation provided by a polyalkoxylated quaternary ammonium salt; wherein the second organic cation is present in an amount of from about 0.01% to about 20% by weight of the total organic cation content.

10. The non-aqueous fluid system of claim 9, wherein said non-aqueous composition is selected from the group consisting of paints, varnishes, enamels, waxes, paint-varnish, lacquer remover, drilling fluids, drilling muds, lubricating grease, inks, soya inks and resins, polyester resins, epoxy resins, mastices, adhesives, sealants, cosmetics, and detergents.

11. The organophilic clay of claim 1, wherein the first organic cation is benzyl dimethyl monohydrogenated tallow quaternary ammonium chloride, and the second organic cation is methyl bis(polyoxyethylene [15]) cocoalkyl quaternary ammonium chloride.

12. The organophilic clay of claim 1, wherein the first organic cation is dimethyl dihydrogenated tallow quaternary ammonium chloride, and the second organic cation is methyl bis(polyoxyethylene [15]) cocoalkyl quaternary ammonium chloride.

* * * * *